(12) United States Patent
Whynot

(10) Patent No.: US 7,702,727 B2
(45) Date of Patent: *Apr. 20, 2010

(54) APPARATUS, METHOD, AND COMPUTER PROGRAM FOR PROVIDING MULTIMEDIA PROMPTING IN A COMMUNICATION SYSTEM

(75) Inventor: Stephen R. Whynot, Richardson, TX (US)

(73) Assignee: Avaya, Inc., Westminster, CO (US)

( * ) Notice: Subject to any disclaimer, the term of this patent is extended or adjusted under 35 U.S.C. 154(b) by 973 days.

This patent is subject to a terminal disclaimer.

(21) Appl. No.: 10/674,860

(22) Filed: Sep. 30, 2003

(65) Prior Publication Data

US 2005/0069105 A1 Mar. 31, 2005

(51) Int. Cl.
    G06F 15/16 (2006.01)
(52) U.S. Cl. ............... 709/204; 709/203; 715/718; 715/809; 348/14.01
(58) Field of Classification Search ............ 709/201, 709/203, 204, 206; 715/719, 809; 348/14.01
    See application file for complete search history.

(56) References Cited

U.S. PATENT DOCUMENTS

| | | | | |
|---|---|---|---|---|
| 5,524,137 | A | * | 6/1996 | Rhee ............ 379/88.01 |
| 5,619,555 | A | | 4/1997 | Fenton et al. |
| 5,710,591 | A | | 1/1998 | Bruno et al. |
| 5,812,653 | A | | 9/1998 | Jodoin et al. |
| 5,889,945 | A | | 3/1999 | Porter et al. |
| 6,125,115 | A | | 9/2000 | Smits |
| 6,185,565 | B1 | | 2/2001 | Meubus et al. |
| 6,201,562 | B1 | * | 3/2001 | Lor ............ 348/14.01 |
| 6,259,469 | B1 | * | 7/2001 | Ejima et al. ............ 348/14.01 |
| 6,470,392 | B1 | | 10/2002 | Murase et al. |
| 7,042,879 | B2 | | 5/2006 | Eschbach et al. |
| 7,062,544 | B1 | * | 6/2006 | Ollis ............ 709/220 |
| 2002/0040329 | A1 | | 4/2002 | Cohen et al. |
| 2002/0104096 | A1 | | 8/2002 | Cramer et al. |
| 2002/0170065 | A1 | | 11/2002 | Pinnick |
| 2003/0097332 | A1 | * | 5/2003 | Golasinski et al. ............ 705/40 |
| 2003/0232245 | A1 | * | 12/2003 | Turak et al. ............ 429/231.95 |
| 2003/0236906 | A1 | * | 12/2003 | Klemets et al. ............ 709/231 |
| 2004/0236574 | A1 | * | 11/2004 | Ativanichayaphong et al. .. 704/231 |

FOREIGN PATENT DOCUMENTS

| | | | |
|---|---|---|---|
| WO | WO 01/35595 | A1 | 5/2001 |
| WO | WO 03/051027 | A1 | 6/2003 |

OTHER PUBLICATIONS

Kumar, Korpi, Sengodon: "IP Telephony with H.323, Architectures for Unified Networks and Integrated Services", Apr. 1, 2001, John Wiley & Sons, Inc., US, XP002302183, pp. 134-142 and pp. 290-298.
Office Action mailed Sep. 17, 2008 in U.S. Appl. No. 10/610,511, filed Jun. 30, 2003.
Office Action as issued by the United States Patent and Trademark Office on Apr. 27, 2009 in connection with U.S. Appl. No. 10/610,511, filed Jun. 30, 2003.

* cited by examiner

*Primary Examiner*—David Lazaro

(57) ABSTRACT

A multimedia prompting apparatus, method, and computer program generate and provide a dynamic multimedia prompt to a video client. The dynamic multimedia prompt includes at least two video clips. The multimedia prompting apparatus, method, and computer program generate the dynamic multimedia prompt by selecting at least one of the video clips based at least partially on information provided by the video client.

20 Claims, 2 Drawing Sheets

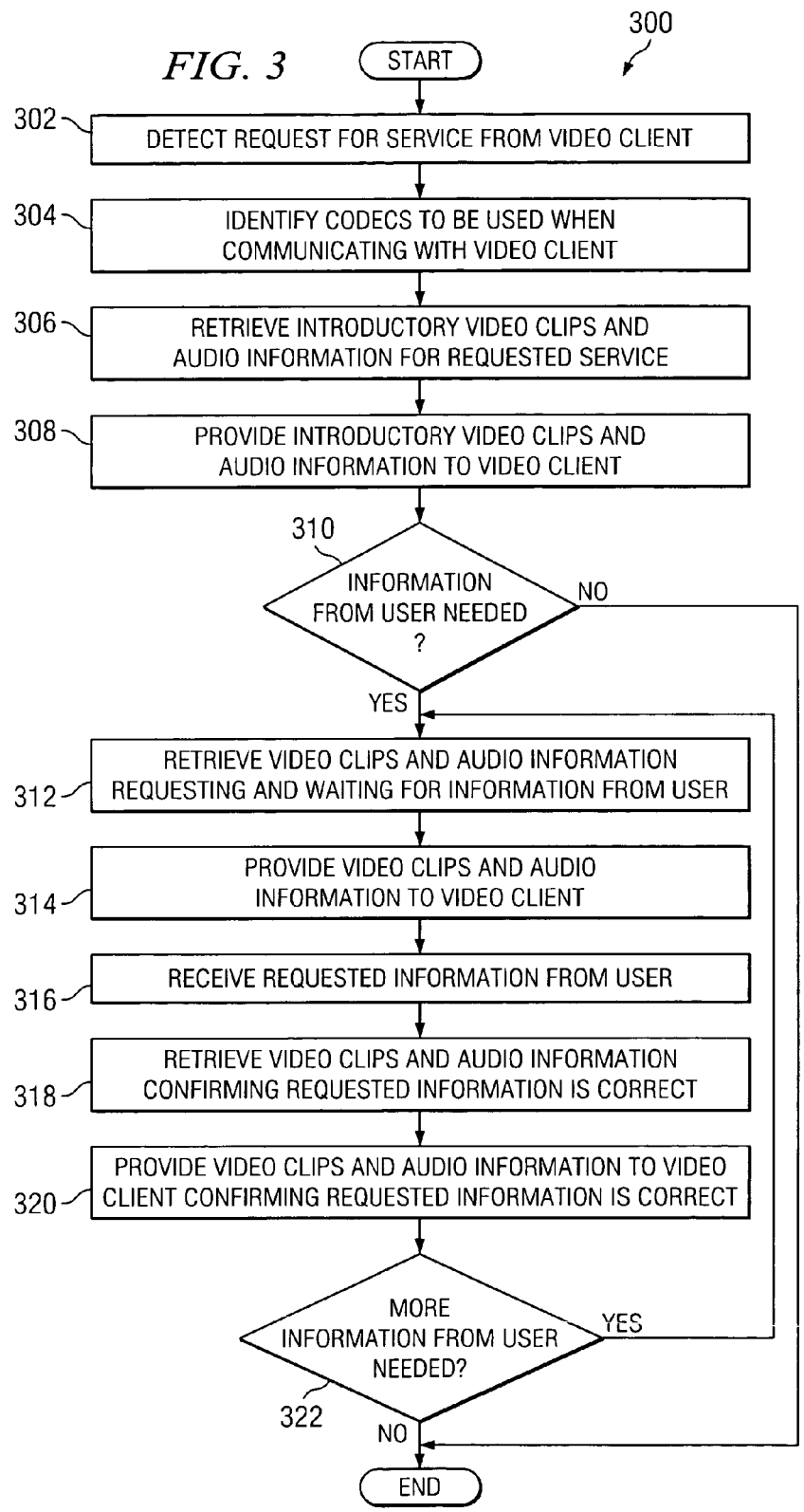

APPARATUS, METHOD, AND COMPUTER PROGRAM FOR PROVIDING MULTIMEDIA PROMPTING IN A COMMUNICATION SYSTEM

CROSS REFERENCE TO RELATED APPLICATIONS

This application is related to U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated herein by reference.

Technical Field

This disclosure relates generally to communication systems and more specifically to an apparatus, method, and computer program for providing multimedia prompting in a communication system.

Background

Communication systems that transport audio and video information are becoming more popular in the United States and around the world. In a conventional communication system, one participant communicates audio signals to other participants (often through a multipoint communication server or other unit) and receives audio signals from the other participants (indirectly through the server). The participants also exchange video images, which allow the participants to see one another.

SUMMARY

This disclosure provides an apparatus, method, and computer program for providing multimedia prompting in a communication system.

In one aspect, a multimedia prompting apparatus, method, and computer program generate and provide a dynamic multimedia prompt to a video client. The dynamic multimedia prompt includes at least two video clips. The multimedia prompting apparatus, method, and computer program generate the dynamic multimedia prompt by selecting at least one of the video clips in response to at least a portion of information received from the video client.

In a particular aspect, the dynamic multimedia prompt includes a first video clip that requests the information from a user of the video client, a second video clip that displays the information received from the video client, and a third video clip that requests confirmation of the information received from the video client.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example method for providing multimedia prompting in a communication system according to one embodiment of this disclosure.

DETAILED DESCRIPTION

Figure 1:
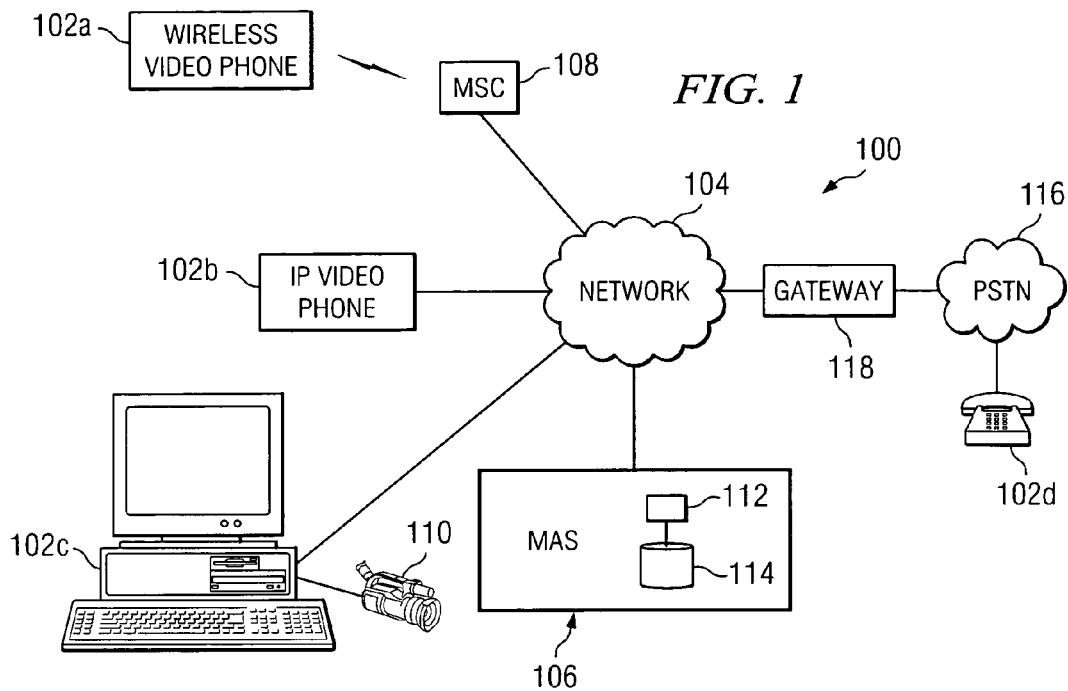
FIG. 1 illustrates an example communication system according to one embodiment of this disclosure.

FIG. 1 illustrates an example communication system 100 according to one embodiment of this disclosure. The system 100 shown in FIG. 1 is for illustration only. Other embodiments of the system 100 may be used without departing from the scope of this disclosure.

A problem with conventional communication systems is that they typically lack an effective mechanism for prompting users. Moreover, conventional communication systems lack effective means for confirming whether information submitted by a user has been properly received and interpreted by the communication systems.

In the illustrated example, the system 100 includes one or more video clients 102a-102c, a network 104, and a media application server ("MAS") 106.

The video clients 102a-102c represent devices used by users or subscribers during communication sessions. Communication sessions represent data conversions or conversations between at least two devices or applications over a network that involve audio and/or video information. For example, each video client 102a-102c represents an input/output device that could include a microphone and a speaker to capture and play audio information. A video client 102a-102c could also include a camera and a display to capture and play video information.

During a communication session, the video clients 102 communicate with the MAS 106 over the network 104. As an example, the video clients 102 may transmit audio and video information to the MAS 106 and receive audio and video information from the MAS 106. As will be appreciated, each video client 102 may be constructed or configured from any suitable hardware, software, firmware, or combination thereof for transmitting or receiving audio or video information.

The system 100 shown in FIG. 1 illustrates various embodiments of the video clients 102. For example, the video client 102a represents a wireless video phone that communicates with the network 104 through a mobile switching center ("MSC") 108. The video client 102b represents a wired Internet Protocol ("IP") video phone that communicates directly with the network 104. The video client 102c represents a personal computer connected to a web camera 110. This represents three possible embodiments of the video clients 102. Other or additional video clients 102 may also be utilized in the system 100 of FIG. 1. By way of illustration in FIG. 1, each of the video clients 102a-102c is different. It will be understood, however, that the video clients 102 in the system 100 may include or represent the same or similar type of device or other combination of video clients.

The network 104 is coupled to the video clients 102, the MAS 106, and the mobile switching center 108. In this document, the term "couple" refers to any direct or indirect communication between two or more components, whether or not those components are in physical contact with each other. The network 104 facilitates communication between components of the system 100. For example, the network 104 may communicate Internet Packets ("IP"), frame relay frames, Asynchronous Transfer Mode ("ATM") cells, Ethernet, X.25, frame relay, or other suitable information protocols between network addresses or devices. The network 104 may include one or more local area networks ("LANs"), metropolitan area networks ("MANs"), wide area networks ("WANs"), all or portions of a global network such as the Internet, or any other communication system or systems at one or more locations.

The media application server ("MAS") 106 is coupled to the network 104. The MAS 106 supports communication sessions between video clients 102 in the system 100. For example, the MAS 106 may receive requests from the video clients 102 to establish or join a communication session. The MAS 106 may also receive audio and video information from one video client 102 and communicate the information to the other video clients 102 involved in a communication session.

Figure 2:
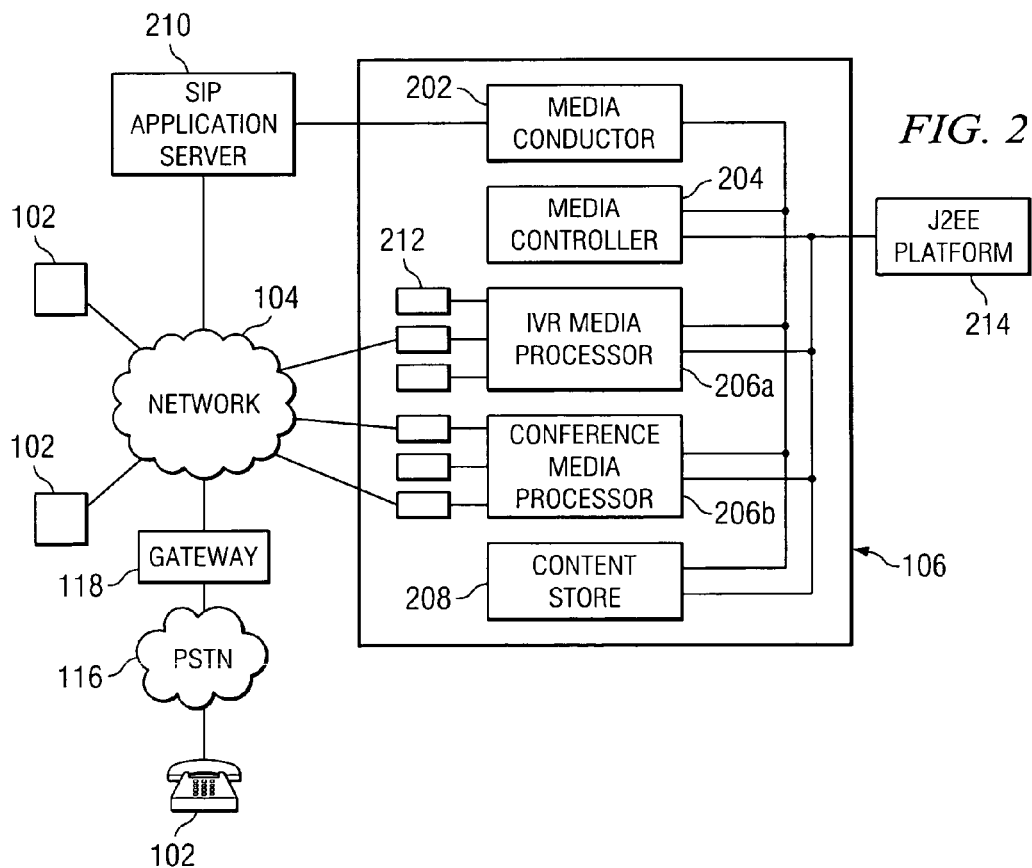
FIG. 2 illustrates an example media application server according to one embodiment of this disclosure.

The MAS 106 may be constructed or configured using any hardware, software, firmware, or combination thereof for supporting communication sessions in the system 100. As an example, the MAS 106 could include one or more processors 112 that execute instructions and one or more memories 114 that store instructions and data used by the processors 112. The processor(s) 112 is generally understood to be a device that drives a general-purpose computer. It is noted, however, that other processor devices such as microcontrollers, Field Programmable Gate Arrays (FPGAs), or Application Specific Integrated Circuits (ASICs) can be used as well and achieve the benefits and advantages described herein. An example MAS 106 is shown in FIG. 2, which is described below and in co-pending U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated by reference herein.

Communication sessions established and managed by the MAS 106 can include communication devices other than the video clients 102a-102c. For example, a video or other client 102d is shown coupled to the network 104 through a public telephone network, such as a public switched telephone network ("PSTN") 116. The video client 102d may include a conventional analog or digital telephone, a personal computer, or some other type of communication device. In embodiments where the PSTN 116 and the network 104 use different or incompatible protocols to communicate, a gateway 118 may be used that is coupled to the network 104 and the PSTN 116 to facilitate communication between the networks. The gateway 118 functions to translate between the different protocols used by the network 104 and the PSTN 116. Although one PSTN 116 is shown in FIG. 1 coupled to the network 104, other or additional types of public or private networks may be coupled to the network 104.

The video clients 102 and the MAS 106 could support suitable standards or protocols used to set up, maintain, and terminate communication sessions between end users. As examples, the video clients 102 and the MAS 106 could communicate audio, video, or other information using the Realtime Transfer Protocol ("RTP") over User Datagram Protocol ("UDP"), the International Telecommunication Union-Telecommunications ("ITU-T") H.263 standard (video CODEC), the G.711 and G.729 audio CODEC standards, and other or additional standards or protocols. Other CODECs, such as Moving Picture Experts Group-4 ("MPEG-4"), Digital Video Express ("DIVX"), and Windows Media Video ("WMV"), can be supported by the MAS 106. In addition, signaling messages sent between the video clients 102 and the MAS 106 may include or conform with the Session Initiation Protocol ("SIP"), which is an application layer protocol for the establishment, modification, and termination of conferencing and telephony sessions over IP-based networks. As will be appreciated, other or additional protocols and configurations may be used.

In one aspect of operation, the MAS 106 provides one or more multimedia prompts to a user of a video client 102. A multimedia prompt may include a sequence of video information, which may optionally have associated audio information, that guides the user through a process. For example, a user of a video client 102 may attempt to access a particular service in the system 100, such as a movie schedule. The multimedia prompts appear on the user's video client 102 and guide the user through the various options of the movie schedule, such as locating the theatre and the desired movie.

In some embodiments, the MAS 106 supports both static and dynamic multimedia prompts. As an example of a static prompt, the MAS 106 could provide a multimedia prompt that requests the user of a video client 102 to enter a destination number when the user wishes to initiate a communication session. The destination number identifies the video client 102 that the user wishes to contact. The multimedia prompt then waits for the user to enter the destination number. The user could enter the number in a variety of ways, such as by speaking the destination number or entering the destination number using a keypad on the video client 102. The multimedia prompt then requests the user to enter the user's personal identification number ("PIN"). The multimedia prompt then waits for the user to enter the PIN. When the PIN is provided, the multimedia prompt ends, and the MAS 106 initiates the communication session.

The MAS 106 could also generate and provide dynamic multimedia prompts to a video client 102. Using the same example from above, the MAS 106 could provide a multimedia prompt of a person (or other animate or inanimate object) requesting the user to enter a destination number. As the user provides each numeral of the destination number, the MAS 106 changes the multimedia prompt to physically display the numeral provided. In other words, when the user provides a numeral of the destination number, the MAS 106 changes the multimedia prompt so that it shows or displays the numeral provided by the user. When the user provides another numeral of the destination number, the MAS 106 again changes the multimedia prompt to display the second numeral on the video client 102. This continues until the entire destination number has been entered, at which point the MAS 106 changes the multimedia prompt to show or display a person requesting whether the destination number displayed by the MAS 106 is correct. If correct, the MAS 106 changes the multimedia prompt so that it shows the person requesting the user's PIN, and the process may be repeated with additional numerals entered by the user.

This represents one possible multimedia prompt that could be generated. Another multimedia prompt could show a person requesting a destination number and then waiting for the entire number to be provided. Once the entire number is provided, the multimedia prompt could request confirmation, display the sequence of numerals detected by the MAS 106, and show the person waiting for the user to confirm that the displayed numbers were correct. A similar process could be used to obtain the user's PIN.

In addition to changing the multimedia prompt to display the various numerals of the destination number and the user's PIN, the MAS 106 could optionally provide audio information so the user hears the numerals detected by the MAS 106. In this way, the MAS 106 mixes audio, video, and text to create a dynamic multimedia prompt for a user.

In these examples, a dynamic multimedia prompt provided by the MAS 106 includes a sequence of video clips. Each video clip represents a sequence of one or more video images to be presented to and displayed by a video client 102. The video clips represent, for example, images of the person requesting the destination number, the person waiting for the destination number, each possible numeral (such as zero through nine) in the destination number, and the person requesting confirmation. The MAS 106 generates a multimedia prompt by switching between various video clips as needed. For example, the video clips of the person requesting information or waiting may be mixed with video clips of numerals provided by the user. This allows the MAS 106 to generate any number of possible multimedia prompts and dynamically alter the prompts based on user input. While these examples describe the use of video clips to display numbers provided by the user, other video clips may include days of the week, months, years, monetary values, or any other suitable information.

In some embodiments, the various video clips used to generate a multimedia prompt may be encoded and stored in the MAS 106 or in a location accessible to the MAS 106 (not shown). In particular embodiments, each video clip is encoded using multiple CODECs. When a particular video client 102 accesses the MAS 106, the MAS 106 negotiates with the video client 102 and attempts to identify CODECs to be used when sending audio and video information to the video client 102. During the negotiation, the MAS 106 attempts to identify the CODEC(s) used by the video client 102 and the CODEC(s) used to encode the video clips. If possible, a CODEC used by the video client 102 and to encode the video clips is selected during the negotiation process. In this way, the video clips can be provided to the video client 102 without needing to decode and recode the video clips. This helps to reduce the processing load placed on the MAS 106.

Although FIG. 1 illustrates one example of a communication system 100, various changes may be made to FIG. 1. For example, varying video clients 102, networks 104, and servers 106 could be used in the system 100. Also, the functionality of MAS 106, described above as being implemented on a server, could be implemented on any other computing device, such as a desktop computer or a laptop computer. In addition, FIG. 1 illustrates one operational environment in which the various features of the MAS 106 may be used. These features could be implemented in any other suitable operating environment.

FIG. 2 illustrates an example media application server 106 according to one embodiment of this disclosure. The MAS 106 illustrated in FIG. 2 is for illustration only. Other embodiments of the MAS 106 could be used without departing from the scope of this disclosure. Also, while FIG. 2 illustrates the MAS 106 operating in the system 100 of FIG. 1, the MAS 106 may operate in other suitable systems.

In the illustrated example, the MAS 106 includes a media conductor 202, a media controller 204, two media processors ("MPs") 206a-206b, and a content store 208.

The media conductor 202 processes signaling messages received by the MAS 106. In some embodiments, the video clients 102 communicate the signaling messages directly (or via a gateway, which serves as an entrance/exit into a communications network) to the MAS 106. In other embodiments, the video clients 102 communicate signaling messages indirectly to the MAS 106, such as when a Session Initiation Protocol ("SIP") application server 210 (that received a request from a video client 102) sends the signaling messages to the media conductor 202 on behalf of the video client 102. The video clients 102 may communicate directly with the SIP application server 210 or indirectly through a gateway, such as gateway 118. The conductor 202 processes the signaling messages and communicates the processed messages to the media controller 204. As particular examples, the conductor 202 may implement SIP call control, parameter encoding, and media event package functionality.

The media controller 204 manages the operation of the MAS 106 to provide services to the video clients 102. For example, the media controller 204 may receive processed SIP requests from the conductor 202, where the requests involve conference or other calls. The controller 204 may then select the media processor 206 to handle each of the calls, support audio/video capability negotiations, enforce licenses controlling how the MAS 106 can be used, and control negotiations based on the licenses. The negotiations could include identifying the CODEC or CODECs to be used to encode and decode audio or video information during a call.

The media processors 206a-206b handle the exchange of audio or video information between video clients 102 involved in a call. For example, a media processor 206 could receive audio and video information from one video client 102 involved in a call, process the information as needed, and forward the information to at least one other video client 102 involved in the call. The audio and video information may be received through one or more ports 212, which couple the media processors 206 to the network 104. The ports 212 may represent any suitable structure operable to facilitate communication between the MAS 106 and the network 104. In some embodiments, each of the media processors 206 represents a software application for specific media processing, such as interactive voice response ("IVR") media or conference media, which is executed on the MAS 106 hardware platform via the operating system.

In this example embodiment, each media processor 206 provides different functionality in the MAS 106. For example, in some embodiments, the media processor 206a provides IVR functionality in the MAS 106. As particular examples, the media processor 206a supports a voice mail function that can record and play messages or an auto-attendant function that provides a menu and directs callers to particular destinations based on their selections. The media processor 206a also supports the generation of multimedia prompts for a video client 102. The media processor 206b provides call conferencing functionality in the MAS 106, such as by facilitating the exchange of audio and video information between three or more video clients 102.

The content store 208 provides access to content used by the various components of the system 100. For example, in some embodiments, the content store 208 provides access to stored voice mail messages and access codes used to initiate or join conference calls. The content store 208 also provides access to any other or additional information. In other embodiments, the content store 208 is replaced by a conventional database or other data storage facility.

A Java 2 Enterprise Edition ("J2EE") platform 214 is coupled to the MAS 106. The J2EE platform 214 allows the MAS 106 to retrieve information used to provide subscriber services in the system 100. For example, the J2EE platform 214 may provide audio announcements and video clips used by the IVR media processor 206a to produce multimedia prompts. The J2EE platform 214 represents one possible apparatus used to provide audio or other information to the MAS 106. Any other or additional device or apparatus may be used to provide the information to the MAS 106.

In a particular embodiment, various components of the MAS 106 represent software processes executed by the processor 112 of the MAS 106. While the components 202-208 have been described as being executed by a MAS 106, the software processes could be executed by other computing devices such as a desktop computer. In other embodiments, the various components of the MAS 106 may be implemented in other ways, such as in hardware.

In one aspect of operation, the MAS 106 generates and provides multimedia prompts to the users of video clients 102. In some embodiments, the MAS 106 provides static or dynamic multimedia prompts to the users. The MAS 106 may use any suitable mechanism to generate the dynamic prompts.

As described above, one technique involves the MAS 106 combining multiple video clips together to generate a multimedia prompt that varies based on information provided by a user. In some embodiments, the IVR media processor 206a is responsible for generating the multimedia prompts. For example, the IVR media processor 206a retrieves the needed video clips from the J2EE platform 214 or other source and provides the proper video clip to a video client 102. The IVR media processor 206a may also retrieve audio information associated with the video clip and provide the audio information to the video client 102. The IVR media processor 206a may further synchronize the audio and video information for presentation to a user of the video client 102. In addition, the IVR media processor 206a may receive information provided by the user of the video client 102 and alter the multimedia prompt by providing particular video clips based on input from the user.

As described above, the user of a video client 102 provides information to the MAS 106 in any suitable manner, including speaking the information and using a keypad or other input device at the video client 102. If the user of a video client 102 provides information to the MAS 106 by speaking (such as when the user provides a destination number or PIN by speaking the numerals), the IVR media processor 206a performs speech recognition to identify what the user is saying.

Also, in some embodiments, the video clips and associated audio information are encoded using multiple CODECs and stored. The media controller 204 negotiates with the video client 102 during registration and attempts to identify the CODECs to be used when communicating with the video client 102. The user of a video client 102 may have preferred or desired CODECs that the user wishes to use if possible. During the negotiation process, the media controller 204 attempts to first verify whether the preferred CODECs were also used to encode the video clips and audio information. If so, the media controller 204 may allow the video client 102 to use those preferred CODECS. If not, the media controller 204 attempts to identify other CODECs that the video client 102 supports and that were used to encode the video and audio information.

Based on the audio and video CODECs selected during the negotiation process, the IVR media processor 206a retrieves the appropriate video clips and audio information when generating a multimedia prompt. For example, if the same CODECs used by the video client 102 were also used to encode a needed video clip and associated audio information, the IVR media processor 206a retrieves and transmits the proper video clip and audio information to the video client 102 without the need to decode the information first. If the video client 102 supports CODECs that were not used to encode the video clips and audio information, the MAS 106 would function to transcode (or translate) information from one CODEC format to another CODEC format. In this way, video clients 102 can use any of a wide variety of CODECs to communicate with and receive service from the MAS 106.

Although FIG. 2 illustrates one example of a media application server 106, various changes may be made to FIG. 2. For example, any number of media processors 206 could be used in the MAS 106. Also, the functional divisions shown in FIG. 2 are for illustration only. Various components can be combined or omitted or additional components can be added according to particular functional designations or needs. In addition, while the components 202-208 have been described as being executed by a server, the components 202-208 may be executed by other hardware platforms, such as a desktop computer or a laptop computer.

FIG. 3 illustrates an example method 300 for providing multimedia prompting in a communication system according to one embodiment of this disclosure. For ease of explanation, the method 300 is described with respect to the MAS 106 of FIG. 2 operating in the system 100 of FIG. 1. The method 300 may also be used by other suitable devices or in any other suitable system.

The MAS 106 detects a request for a service from a video client 102 at step 302. This may include, for example, the media conductor 202 receiving signaling messages from the video client 102 and the media controller 204 identifying a requested service associated with the signaling messages.

The MAS 106 identifies the CODECs to be used by the video client 102 and the MAS 106 to communicate at step 304. This may include, for example, several steps such as the media controller 204 negotiating with the video client 102 to identify the CODECs to be used. The CODECs can be identified in any suitable manner, such as by determining whether the CODECs that might be used include CODECs previously used to encode video clips and audio information and/or determining whether CODECs preferred by the video client 102 can be used to communicate with the video client 102.

The MAS 106 retrieves one or more introductory video clips and associated audio information (optional) for the requested service at step 306. This may include, for example, the IVR media processor 206a retrieving a video clip describing the service and informing the user of the video client 102 that the multimedia prompt will guide the user through the service. If needed, the IVR media processor 206a transcodes the information (video clip or audio information) before providing it to the video client 102 if the video client 102 does not support the CODECs used to encode the audio or video information. The video clips and audio information may be retrieved from any suitable location, such as from the J2EE platform 214. The MAS 106 provides the introductory video clips and audio information to the video client 102 at step 308.

The MAS 106 determines whether information is needed from the user at step 310, such as whether the service requested by the user requires information or other input from the user. If not, method 300 ends, and the MAS 106 may provide the service to the user.

Otherwise, the MAS 106 retrieves one or more video clips and associated audio information (optional) that request needed information and wait for the information at step 312. This may include, for example, the IVR media processor 206a retrieving a video clip of a person requesting the needed information and a video clip of the person waiting. The MAS 106 provides these video clips and audio information to the video client 102 at step 314.

The MAS 106 receives the requested information from the user at step 316. This may be accomplished, for example, by the user speaking the information and the IVR media processor 206a performing speech recognition to process the spoken information, the user using a keypad or other input device at the video client 102 to provide the information, or in any other suitable manner.

The MAS 106 retrieves one or more video clips and audio information (optional) confirming the requested information at step 318. This may include, for example, the IVR media processor 206a retrieving a video clip of each numeral, audio information of a person or other entity saying each numeral, or other information provided by the user. The MAS 106 provides the video clips and audio information (optional) to the video client 102 and requests confirmation that the information is correct at step 320. This may include, for example, the IVR media processor 206a providing a video clip to the video client 102 after the user says each numeral or providing a stream of video clips after the user says all numerals.

The MAS 106 determines whether additional information is needed from the user at step 322. If not, the method 300 ends, and the MAS 106 provides the requested service. Otherwise, the MAS 106 returns to step 312 and attempts to receive the needed information from the user.

Although FIG. 3 illustrates one example of a method 300 for providing multimedia prompting in a communication system, various changes may be made to FIG. 3. For example, FIG. 3 illustrates the MAS 106 generating a particular dynamic multimedia prompt for a video client 102. The multimedia prompt described in FIG. 3 includes an introductory video clip, a video clip asking for information, a video clip of a person waiting for information, video clips of user input, and a video clip of a person asking for confirmation. Other multimedia prompts that include other video clips could be generated by the MAS 106.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for providing multimedia prompting in a communication system, comprising:
   providing a first multimedia prompt to a video client, the first multimedia prompt comprising a first video clip and first audio information associated with the first video clip, the multimedia prompt associated with a service requested by the video client;
   receiving information from the video client in response to the first video clip;
   providing, in response to at least a portion of the information received from the video client, a second video clip to the video client, the second video clip including at least a portion of the information received from the video client;
   identifying, through negotiation with the video client, a CODEC to be used to communicate with the video client; and
   retrieving from memory at least a portion of at least a one of the first multimedia prompt and the second multimedia prompt having been encoded using the identified CODEC and stored in the memory thereafter, the at least a portion stored in memory also having been encoded using a second CODEC different from the identified CODEC and stored in the memory thereafter.

2. The method of claim 1, further comprising providing second audio information associated with the second video clip, the second audio information selected in response to at least a portion of the information received from the video client.

3. The method of claim 2, wherein:
   the first audio information, the second audio information, the first video clip and the second video clip are each encoded and stored using the identified CODEC and are each encoded and stored using the second CODEC.

4. The method of claim 1, wherein:
   the information received from the video client comprises a plurality of numerals; and
   the second video clip comprises a plurality of second video clips each displaying one of the numerals.

5. The method of claim 1, wherein the first video clip comprises a video clip of a person requesting the information and a video clip of the person waiting for the information.

6. The method of claim 1, further comprising providing a third video clip requesting confirmation of the information received from the video client.

7. The method of claim 1, wherein the negotiation with the video client includes determining whether the video client supports one or more of the CODECs used to encode the at least a portion of at least a one the first multimedia prompts and the second multimedia prompts.

8. A computer program embodied on a computer readable medium and operable to be executed by a processor, the computer program comprising computer readable program code for:
   receiving first information from a video client, the first information associated with a service requested by the video client;
   receiving second information from the video client; and
   providing a dynamic multimedia prompt to the video client, the dynamic multimedia prompt comprising a first video clip and first audio information associated with the first video clip, at least a portion of the dynamic multimedia prompt selected based at least partially on the first information received from the video client, and a second video clip including at least a portion of the second information received from the video client;
   identifying, through negotiation with the video client, a CODEC to be used to communicate with the video client; and
   retrieving from memory the dynamic multimedia prompt having been encoded using the identified CODEC and stored in the memory thereafter, the dynamic multimedia prompt also having been encoded using a second CODEC different from the identified CODEC and stored in the memory.

9. The computer program of claim 8, wherein the computer readable program code for providing the dynamic multimedia prompt comprises computer readable program code for:
   providing the first video clip including an image of a person; and
   providing the second video clip including an image of the person.

10. The computer program of claim 8, wherein the first video clip requests the second information from a user of the video client and the second video clip displays the second information received from the video client.

11. The computer program of claim 8, further comprising computer readable program code for providing a third video clip requesting confirmation of the second information received from the video client.

12. The computer program of claim 8, wherein:
   the multimedia prompt comprises a plurality of video clips, each of the video clips encoded and stored using the identified CODEC and each encoded and stored using the second CODEC each compressed using one or more CODECs.

13. The computer program of claim 12, wherein the computer readable program code for determining whether the video client supports one or more of the CODECs used to compress the video clips comprises computer readable program code for determining whether one or more preferred CODECs were used to compress the video clips.

14. The computer program of claim 8, wherein the negotiation with the video client includes determining whether the video client supports one or more of the CODECs used to encode the dynamic multimedia prompt.

15. An apparatus for multimedia prompting, comprising:
a memory operable to store a plurality of video clips, at least some of the video clips associated with one or more services; and
one or more processors collectively operable to:
receive first information from a video client, the first information associated with one of the services that is requested by the video client;
receive second information from the video client;
provide a dynamic multimedia prompt to the video client, the dynamic multimedia prompt comprising a first video clip and first audio information associated with the first video clip and a second video clip, the first video clip selected based at least partially on the first information received from the video client, and a second video clip including at least a portion of the second information received from the video client;
identify, through negotiation with the video client, a CODEC to be used to communicate with the video client; and
retrieve from memory the dynamic multimedia prompt having been encoded using the identified CODEC and stored in the memory thereafter, the dynamic multimedia prompt also having been encoded using a second CODEC different from the identified CODEC and stored in the memory.

16. The apparatus of claim 15, wherein:
the first video clip requests the second information from a user of the video client;
the second video clip displays the second information received from the video client; and
the one or more processors are further collectively operable to provide a third video clip requesting confirmation of the second information received from the video client.

17. The apparatus of claim 15, wherein:
the one or more processors are collectively operable to provide the dynamic multimedia prompt to the video client by providing second audio information associated with the second video clip, the second audio information including at least a portion of second information received from the video client.

18. The apparatus of claim 15, wherein:
the first audio information, the second audio information, the first video clip and the second video clip are each encoded and stored using the identified CODEC and are each encoded and stored using the second CODEC.

19. The apparatus of claim 15, wherein the negotiation with the video client includes determining whether the video client supports one or more of the CODECs used to encode the dynamic multimedia prompt.

20. A method for providing multimedia prompting in a communication system, comprising:
encoding a plurality of video clips using a plurality of different CODECs for each video clip, and storing the encoded video clips;
determining a communication CODEC to be used in communication with a video client, the communication CODEC corresponding to one of the plurality of different CODECs;
providing a first multimedia prompt to a video client, the first multimedia prompt created from a first video clip and first audio information associated with the first video clip, the first video clip from a first one of the plurality of video clips, encoded using the communication CODEC;
receiving information from the video client in response to the first multimedia prompt;
providing, in response to at least a portion of the information received from the video client, a second multimedia prompt to the video client, the second multimedia prompt created from a second one of the plurality of video clips, encoded using the communication CODEC, the second multimedia prompt including at least a portion of the information received from the video client.

* * * * *